United States Patent [19]

Hermann et al.

[11] Patent Number: 4,751,266

[45] Date of Patent: Jun. 14, 1988

[54] POLYVINYLBUTYRAL OF REDUCED TACKINESS AND IMPROVED TENSILE STRENGTH

[75] Inventors: Hans D. Hermann, Bad Soden am Taunus; Ulrich M. Hutten, Kelkheim; Klaus Fabian, Kriftel, all of Fed. Rep. of Germany

[73] Assignee: Hoechst Aktiengesellschaft, Fed. Rep. of Germany

[21] Appl. No.: 762,826

[22] Filed: Aug. 6, 1985

[30] Foreign Application Priority Data

Aug. 10, 1984 [DE] Fed. Rep. of Germany ....... 3429440

[51] Int. Cl.$^4$ ............................................... C08F 8/00
[52] U.S. Cl. .................................................... 525/61
[58] Field of Search ............................................ 525/61

[56] References Cited

U.S. PATENT DOCUMENTS

| | | | |
|---|---|---|---|
| 3,153,009 | 10/1964 | Rombach | 525/56 |
| 3,926,918 | 12/1975 | Shibata et al. | 525/61 |
| 4,205,146 | 5/1980 | Hermann | 525/61 |
| 4,452,935 | 6/1984 | Nomura et al. | 525/61 |

FOREIGN PATENT DOCUMENTS

| | | | |
|---|---|---|---|
| 0120274 | 8/1945 | Canada | 525/61 |
| 0568579 | 1/1959 | Canada | 525/61 |
| 2365005 | 7/1974 | Fed. Rep. of Germany | 525/61 |
| 2355689 | 5/1975 | Fed. Rep. of Germany | 525/61 |
| 0008384 | 5/1964 | Japan | 525/61 |
| 0030706 | 2/1982 | Japan | 525/61 |
| 0217503 | 12/1983 | Japan | 525/61 |
| 0015403 | 1/1984 | Japan | 525/61 |
| 0568914 | 4/1945 | United Kingdom | 525/61 |
| 2007677 | 5/1979 | United Kingdom | |
| 0418487 | 8/1974 | U.S.S.R. | 525/61 |

OTHER PUBLICATIONS

"Production and Properties of Aqueous Polyvinyl Alcohol Solutions"; Harreus et al.; pp. 24–30; Sep. 1983.

*Primary Examiner*—Joseph L. Schofer
*Assistant Examiner*—J. M. Reddick
*Attorney, Agent, or Firm*—Berman, Aisenberg & Platt

[57] ABSTRACT

Polyvinylbutyral of reduced tackiness and improved tensile strength is prepared by acetalization of polyvinyl alcohol, which is capable of association, in the associated state with n-butyraldehyde in aqueous phase in the presence of an acid catalyst. In the process for its preparation from more highly saponified, associated polyvinyl alcohol having a vinyl acetate unit content of less than 1% by weight, the acetalization is started preferably at temperatures below 20° C. and the temperature is raised to above 40° C. in the course of the reaction. Use for the production of plasticized thermoplastic polyvinylbutyral films and use of the latter as the joining layer in laminated glass.

1 Claim, No Drawings

POLYVINYLBUTYRAL OF REDUCED TACKINESS AND IMPROVED TENSILE STRENGTH

The invention relates to polyvinylbutyral of reduced tackiness and improved tensile strength, to processes for the preparation thereof and to its use for the production of plasticized thermoplastic molding compositions, in particular of high-strength films, which are outstandingly suitable as the joining interlayer in the manufacture of laminated glass.

It is known that polyvinylbutyral can be processed, with the addition of plasticizer, into films which can be used as the interlayer in laminated glass. One of the methods of preparing polyvinylbutyral suitable for this purpose comprises, for example, the reaction of an aqueous polyvinyl alcohol solution with n-butyraldehyde in the presence of a strong acid.

In European Patent No. 0,000,699, a process is described in which the conventional method of preparing polyvinylbutyral is followed by an aftertreatment phase at 50° to 70° C. in the presence of an organic sulfonic acid having an emulsifying action. Films which have a higher strength, a higher viscosity and a reduced tackiness can be produced, with the addition of a plasticizer, from a polyvinylbutyral aftertreated in this way.

Subsequently, there has been no lack of attempts to achieve the advantageous properties of these polyvinylbutyral polymers, aftertreated in the manner described above, by a different approach. One of the reasons for the search for an improved process was the corrosive action of the sulfonic acid component, although this can be controlled technically.

Thus, for example, it was suggested to replace the organic sulfonic acid, having an emulsifying action, or its salts by water-soluble salts of perchloric acid, hydrochloric acid, hydrobromic acid, nitric acid or thiocyanic acid. However, these salts are substantially less active than the said organic sulfonates. They must therefore be employed in a substantially higher concentration, and this leads to difficulties in the working-up of the polymers, even intensifies the corrosion problems during their preparation and, in addition, is less economical.

All the processes share the common feature that the aftertreatment leads to an enhancement of the intermolecular forces between the polymer molecules.

The increase in hydrogen bonds can be detected, for example, by a broadening of the OH band in the infrared spectrum.

The disadvantages known from the state of the art in the preparation of improved polyvinylbutyrals show that there is an undiminished considerable demand for achieving an increase in the intermolecular forces in polyvinylbutyral by means of simpler methods.

It has now been found, surprisingly, that polyvinylbutyral with considerably improved properties can be obtained, while overcoming the known difficulties and disadvantages, by acetalizing polyvinyl alcohol, which is capable of association, in aqueous phase in the associated state.

The subject of the invention is therefore a process for the preparation of polyvinylbutyral of reduced tackiness and improved tensile strength by acetalization of polyvinyl alcohol with n-butyraldehyde in aqueous phase in the presence of an acid catalyst, which process comprises acetalizing polyvinyl alcohol, which is capable of association, in the associated state.

According to the invention, any desired polyvinyl alcohols, which can form associates in aqueous solution, can be used as the starting components. In a preferred embodiment of the invention, the association capacity of polyvinyl alcohol can be appropriately increased by reducing its acetyl group content.

Compared with known polyvinylbutyral preparation processes, the preparation process according to the invention is distinguished, inter alia, by the fact that it can be carried out under milder reaction conditions, such as, for example, shorter reaction times, lower temperatures and/or lower concentrations of organic sulfonic acid having an emulsifying action, or even complete absence of such sulfonic acids or additions of salts. Compared with polyvinylbutyral prepared from non-associated polyvinyl alcohol, polyvinylbutyral prepared according to the invention possesses higher intermolecular forces. Plasticized films from the polymer prepared according to the invention show reduced flow at temperatures below 100° C., are stronger and less tacky than plasticized polyvinylbutyrals comparably prepared from non-associated polyvinyl alcohol.

The excellent optical clarity of plasticized polyvinylbutyral films prepared according to the invention is also surprising. By contrast, it is pointed out in the literature that an association of the polyvinyl alcohol, which can occur, for example, at unduly low acetalization temperatures, must be avoided in the preparation of polyvinylbutyral in aqueous phase, since otherwise the resulting polyvinylbutyral no longer gives clear solutions in conventional solvents, which can be regarded as also including plasticizers (cf. Piastro et al., Soviet Plastics 1970, No. 2, page 7). In contrast to this finding known from the literature, clear films are obtained in the processing of polyvinylbutyrals prepared according to the invention with conventional plasticizers.

In the preparation, according to the invention, of polyvinylbutyral it is important that the polyvinyl alcohol to be reacted is present in aqueous solution in the associated form, before the reaction with n-butyraldehyde starts. As already mentioned, any desired polyvinyl alcohols can be used as the starting components, provided that they can form associates in aqueous solution. A further condition is that the aqueous solutions of the associated polyvinyl alcohol are still flowable under acetalization conditions. The presence of an associate to be employed according to the invention can readily be established by the fact that the aqueous polyvinyl alcohol solution shows a rise in viscosity when left to stand after heating to a temperature of 90° to 100° C. and cooling to room temperature.

With polyvinyl alcohols containing less than 1% by weight, preferably less than 0.5% by weight, of vinyl acetate units, an association—detectable by the rise in viscosity of the solution when left to stand at a low temperature—can be obtained relatively easily by, for example, storing the solution before the acetalization for up to several days at a low temperature. The association is accelerated by cooling to low temperatures down to −5° C. It is also advantageous to accelerate the association of a commercially available polyvinyl alcohol, which contains more than 1% by weight and preferably less than 5% by weight of vinyl acetate units and which associates only slightly or not at all at room temperature in aqueous solution, by complete or partial saponification of its acetyl groups still present. The resulting saponified polyvinyl alcohol should then contain less than 1% by weight, preferably less than 0.5% by weight, of residual vinyl acetate units. The saponification can readily be achieved by an addition of stoichiometric quantities of alkali, for example aqueous sodium hydroxide solution or potassium hydroxide solution, to the aqueous solution of the polyvinyl alcohol, preferably with stirring at elevated temperatures between 30° and 100° C., preferably 50° to 95° C. (cf. for example German Offenlegungsschrift No. 2,039,467). Depending on the final residual acetyl content, the association of the polyvinyl alcohol can take place within a short or even very short time. In virtually 100% saponified polyvinyl alcohol, association can have taken place at a low temperature after, for example, 5 to 10 minutes. Storage of the solution for more than 24 hours is not necessary in most cases. The temperature at which the association takes place is preferably below 40° C., in particular between 15° and 20° C. The duration of association is preferably at least 10 minutes and can be up to 24 hours. If appropriate, it is also sufficient in some cases when only a part of the polyvinyl alcohol, preferably at least 20% by weight of the total quantity, is resaponified in the manner described above.

The associated polyvinyl alcohol is then reacted in aqueous phase with n-butyraldehyde by known methods.

A further subject of the invention is therefore a process for the preparation of polyvinylbutyral of reduced tackiness and improved tensile strength by acetalization of polyvinyl alcohol with n-butyraldehyde in aqueous phase in the presence of an acid catalyst, which process comprises saponifying polyvinyl alcohol with more than 1% by weight, preferably 1 to 5% by weight, of vinyl acetate units in aqueous solution with an addition of alkali down to a content of less than 1% by weight, preferably less than 0.5% by weight, of vinyl acetate units and acetalizing the saponified polyvinyl alcohol in the aqueous solution in the associated state.

As already mentioned, the preparation of polyvinylbutyral polymers according to the invention can be carried out in aqueous phase by known methods. The reaction with n-butyraldehyde is carried out in the presence of strong, preferably inorganic, acid, such as hydrochloric acid, sulfuric acid or nitric acid, in a concentration of 0.1 to 5% by weight, relative to the aqueous phase. In a preferred method, the acetalization is started below 20° C., preferably at 0° to 15° C., and the temperature is raised to above 40° C. in the course of the reaction.

If appropriate, any desired emulsifiers can advantageously be present in addition to the mineral acid, in particular an organic sulfonic acid having an emulsifying action, or salts thereof. Moreover, other salts, such as alkali metal chlorides, bromides, nitrates, perchlorates or acetates can also be added. The presence of these additives can be advantageous in particular if the actual preparation of the polymer is followed by an aftertreatment phase at 50° C. to 70° C. for 0.5 to 10 hours, preferably 1 to 7 hours. Corresponding to their different activities, the concentration of the additives can preferably be between 0.01 and 20% by weight, relative to polyvinylbutyral. It is particularly advantageous to use up to 1% by weight, in particular from 0.01 to 0.5% by weight, preferably from 0.05 to 0.4% by weight, of an organic sulfonic acid (having, for example, 8 to 30 carbon atoms and having an emulsifying action) or a salt thereof.

Polyvinyl alcohols having low to high molecular weights are in principle suitable for the preparation of polyvinylbutyral. For the production of lamination films, however, polyvinylbutyrals are required which have a viscosity (measured according to DIN 53015 on a 5% by weight solution in ethanol at 23° C.) from 10 to 200 mPa·s, preferably from 50 to 100 mPa·s. This viscosity is adjusted by selection of appropriate polyvinyl alcohols.

The resulting polyvinylbutyral can have a residual vinyl alcohol unit content of 14 to 28% by weight, preferably 15 to 24% by weight. This vinyl alcohol content can be adjusted by varying the quantity of butyraldehyde employed in the acetalization.

After the polyvinylbutyral has been separated off from the aqueous phase, the polymer is washed until neutral as usual, preferably treated according to known methods with a small quantity of alkali and dried. The processing of the polyvinylbutyral into plasticized lamination films, together with a plasticizer, is also carried out by known methods.

The quantity of the plasticizer to be added in the production of lamination films is in general 20 to 50 parts by weight per 100 parts by weight of polyvinylbutyral. The plasticizers employed are the conventionally used compounds, for example esters of polyhydric alcohols or of polybasic acids. Suitable examples are esters of triethylene glycol with aliphatic carboxylic acids having 6 to 10 carbon atoms, such as, in particular, 2-ethylbutyric acid, glycerol mono-oleate, dibutyl sebacate, di-$\beta$-butoxymethyl adipate, dioctyl phthalate and tricresyl phosphate. These plasticizers can be used individually or in mixtures.

It is also possible to add substances which stabilize the mixture against degradation, for example small quantities of alkali or salts having an alkaline reaction, and also oxidation stabilizers, such as the phenols, bisphenols or terpene phenols, which are substituted in the 2-, 4- and/or 6-position.

Finally, the mixtures can also contain additives which influence the adhesion of the films to one another or to glass, for example salts of carboxylic acids, fluorides, lecithin or alkyleneureas.

Both the said stabilizers and the additives for influencing the adhesion can usually be added in quantities from 0.001 to 1 per cent by weight, relative to the total mixture. Polyvinylbutyral, plasticizer and, if appropriate, additives can be mixed in a known manner by stirring them together and, if necessary, leaving the mixture to stand, or by kneading or milling at an elevated temperature or even directly during processing on the calender or in the extruder.

The manufacture of laminated glass from laminating films which contain polyvinylbutyral prepared according to the invention can be carried out by the conventional methods, for example by compression-molding between two glass sheets at 120° to 160° C. under 5 to 20 bar.

Polyvinylbutyral prepared according to the invention from associated polyvinyl alcohol is itself novel. Its surprisingly advantageous properties such as, for example, its reduced tackiness, its improved tensile strength and its diminished flowability, can inter alia perhaps be explained by the presence of, for example, blocks of syndiotactic polyvinyl alcohol sequences in the polyvinyl alcohol molecules capable of association, which blocks can associate with similar sequences in adjoining polyvinyl alcohol molecules, forming strong hydrogen bonds. During the acetalization reaction of the polyvinyl alcohol in the associated state in aqueous phase, the hydrogen bonds between the said polyvinyl alcohol sequences are evidently preserved, surprisingly, sometimes even up to maximum temperatures of 50° to 70° C., and effect permanent partial physical crosslinking in the resulting polyvinylbutyral.

Further subjects of the invention are the use of plasticized polyvinylbutyral according to the invention in the form of thermoplastic films for the manufacture of laminated glass, as well as laminated glass which contains the latter film as the joining layer.

The invention is explained in more detail by the examples which follow.

EXAMPLE 1

(a) (Comparison)

1000 parts by weight of a 10% by weight aqueous polyvinyl alcohol solution (degree of polymerization $P_n$ about 1400, 2.2% by weight of vinyl acetate units, relative to the polymer), which had previously been kept for 1 hour at 15° C., are mixed with 65 parts by weight of concentrated hydrochloric acid and the mixture is reacted at 15° C. with n-butyraldehyde. For this purpose, 58 parts by weight of n-butyraldehyde are added continuously in the course of 30 minutes. During this time, the polyvinylbutyral being formed precipitates as fine particles. 30 minutes after the end of the addition of aldehyde, the reaction mixture is heated to 58° C. at a rate of 20° C./hour. When that temperature is reached, 0.15 part by weight of a $C_{15}$-alkanesulfonic acid is added and the mixture is stirred for 5 hours at 58° C. Subsequently, it is cooled, the polyvinylbutyral is filtered off, washed with water until neutral and stirred with a mixture of 750 parts by weight of water and 2.5 parts by weight of 10% by weight sodium hydroxide solution for 1 hour at 60° C., and the product is filtered off and dried at 40° C. in vacuo. The pulverulent polymer is mixed with 29% by weight (relative to the mixture) of triethylene glycol bis-2-ethylbutyrate as the plasticizer and 0.01% by weight of potassium formate (10% by weight in water) and extruded to give a 0.76 mm thick film. Laminated glass of 30×30 cm size is produced in an autoclave at 12 bar and 140° C. from the film, conditioned at 23° C. and 50% relative humidity, with 3 mm thick float glass.

(b) (according to the invention)

The polyvinyl alcohol solution employed in experiment (a) is heated before the acetalization to 90° C., treated with 7.5 parts by weight of 10% by weight sodium hydroxide solution, with stirring, and kept for 30 minutes at this temperature. Due to this measure, the vinyl acetate unit content inthe polyvinyl alcohol falls to 0.6% by weight. After the solution has cooled to 15° C., the polyvinyl alcohol is reacted, as described under (a), with butyraldehyde, the reaction mixture is worked up, and the polymer is processed into a film and the film is processed into laminated glass.

The polyvinylbutyral polymers, obtained according to Examples 1(a) and (b), and the plasticized films and the laminated galss produced from them show the properties reproduced in summary in Table 1.

TABLE 1

| Example 1 | Polymer Viscosity[1] (mPa.s) | Vinyl alcohol unit content (% by weight) | Film Melt index $i_{10}$[2] (g/10 min) | Tackiness[3] (seconds) | Laminated glass Mean fracture height[4] (m) |
|---|---|---|---|---|---|
| (a) (Comparison) | 81 | 20.4 | 2.5 | 1800 | 6.3 |
| (b) (according to the invention) | 125 | 20.6 | 1.9 | 1400 | 7.1 |

[1]Measured according to DIN 53015 at 23° C. on a 5% by weight ethanolic solution prepared at room temperature.
[2]Determination according to DIN 53735 at 150° C. under a load of 10 kg.
[3]Determination according to European Patent 0,000,699, page 5.
[4]Drop test according to DIN 52306 with a steel ball of 2.26 kg weight. At the mean fracture height, 50% of the sheets tested are pierced.

The example makes it clear that a reduction in the acetyl group content of the polyvinyl alcohol promotes the association of the polymer and that this association manifests itself even after the acetalization by a higher viscosity of the polyvinylbutyral in the solution and in the melt. Furthermore, a reduction in tackiness results in the polymer of Example 1(b), prepared according to the invention.

EXAMPLE 2

In a manner similar to that described in Example 1, a polyvinyl alcohol having a degree of polymerization $P_n$ of about 1300 and a vinyl acetate unit content of 1.8% by weight is acetalized. The polyvinyl alcohol is here reacted with n-butyraldehyde on the one hand in the original state (Example 2a, comparison) and, on the other hand, after complete saponification of the acetyl groups (Example 2b, according to the invention). For this saponification, 1000 parts by weight of 10% by weight polyvinyl alcohol solution are stirred for 30 minutes at 90° C. with 10 parts by weight of 10% by weight sodium hydroxide solution. After cooling to room temperature, the saponified polyvinyl alcohol solution is left to stand for 24 hours and then acetalized. The acetalization is carried out as discussed in Example 1, but with the following alterations: absence of alkanesulfonic acid, quantity of n-butyraldehyde=57 parts by weight, heating to 60° C. at a rate of 20° C./hour and keeping at this temperature for 1 hour. The polymers are worked up and the films are produced as described in Example 1.

The polyvinylbutyral polymers and the plasticized films produced from them have the properties reproduced in summary in Table 2.

TABLE 2

| Example 2 | Polymer Vinyl alcohol unit content (% by weight) | Film Melt index[1][2] | | Tensile strength (N/mm²)[3] |
|---|---|---|---|---|
| | | $i_{10}$ 150° C. (g/10 min.) | $i_{20}$ 80° C. (mg/h) | |
| (a) (Comparison) | 21.6 | 6.9 | 210 | 24.0 |
| (b) (according to the | 21.8 | 3.4 | 50 | 26.5 |

TABLE 2-continued

| Example 2 (invention) | Polymer Vinyl alcohol unit content (% by weight) | Film Melt index[1][2] $i_{10}$ 150° C. (g/10 min.) | $i_{20}$ 80° C. (mg/h) | Tensile strength (N/mm²)[3] |
|---|---|---|---|---|

[1] Determination according to DIN 53735 at 150° C. under a load of 10 kg.
[2] Determination of the discharge in mg/hour at 80° C. under a load of 21.6 kg. Apparatus as in the $i_{10}$ measurement.
[3] Determination according to DIN 53455 after conditioning at 23° C. and 50% relative humidity, drawing rate 20 cm/min., clamping length 50 mm, width of the measurement strips 15 mm.

EXAMPLE 3

In the same way as described in Example 2, the vinyl acetate unit content in a polyvinyl alcohol having a degree of polymerization $P_n$ of about 1400 is reduced by resaponification from 1.6 to 0.4% by weight, the resaponified polyvinyl alcohol is actalized, and a polyvinylbutyral having a vinyl alcohol unit content of 19.8% by weight is then obtained. A 5% by weight solution, prepared at room temperature, of this polyvinylbutyral polymer in ethanol has a viscosity of 140 mPa.s at 23° C.

Films prepared from this polyvinylbutyral and containing 9% by weight of triethylene glycol bis-heptanoate as the plasticizer have a tensile strength of 27.5 N/mm² and a melt index $i_{10}$ at 150° C. of 2.8 g/10 min.

A polyvinylbutyral prepared in parallel thereto from the untreated, i.e. non-resaponified starting polyvinyl alcohol and comparably processed gives the following values:

Viscosity: 80 mPa·s,
Tensile strength: 26 N/mm²,
Melt index $i_{10}$ at 150° C.: 4.4 g/10 min.

EXAMPLE 4

(a) (according to the invention)

1000 parts by weight of a 10% by weight solution of polyvinyl alcohol having a degree of polymerization $P_n$ of about 1300 and a vinyl acetate unit content of 1.8% by weight are heated to 90° C. and, after the addition of 9.3 parts by weight of 10% by weight sodium hydroxide solution, stirred for 30 minutes at 90° C. The solution is then cooled to 16° C., the cooling time between 40° C. and 16° C. being 20 minutes, and treated with 65 parts by weight of concentrated hydrochloric acid. 57.6 parts by weight of n-butyraldehyde are added continuously to this mixture in the course of 20 minutes, with stirring. One hour after completion of the aldehyde addition, the batch is heated with stirring to 50° C. within one hour and kept for three hours at this temperature. After working up as described in Example 1, a pulverulent polyvinylbutyral containing 21.6% by weight of vinyl alcohol units and 0.1% by weight of vinyl acetate units is obtained. The polymer is mixed with 29% by weight of triethylene glycol bis-heptanoate as the plasticizer and 0.015% by weight of potassium formate (10% by weight in water), relative to the mixture, and extruded to give a 0.76 mm thick film. Laminated glass is produced from the film, as described in Example 1.

(b) (Comparison)

Example 4(a) is repeated, but with the difference that the polyvinyl alcohol used as the starting material is acetalized without resaponification. In addition, and in contrast to the above Example 4(a), 0.15 part by weight of sodium dodecylbenzenesulfonate is added to the acetalization mixture. In other respects, the acetalization conditions do not differ from those in Example 4(a). This gives a polyvinylbutyral with a vinyl alcohol unit content of 21.3% by weight. Films and laminated glass are produced from this polyvinylbutyral, as described in Example 4(a).

The polyvinylbutyral polymers, obtained according to Examples 4(a) and (b), and the plasticized films and laminated glass produced from them have the properties reproduced in summary Table 3.

TABLE 3

| Example 4 | Polymer viscosity[1] (mPa.s) | Film Melt index $i_{10}$ 150° C.[2] (g/10 min.) | $i_{20}$ 80° C.[3] (mg/h) | Tensile strength (N/mm²) | Strength at 100% elongation (N/mm²) | Tackiness (seconds) | Laminated glass Mean fracture height (m) |
|---|---|---|---|---|---|---|---|
| (a) (according to the invention) | 90 | 4.0 | 80 | 25 | 2.6 | 1850 | 7.1 |
| (b) (Comparison) | 72 | 6.1 | 360 | 24 | 2.1 | 3100 | 6.5 |

[1] Measured according to DIN 53015 at 23° C. on a 5% by weight ethanolic solution prepared at room temperature.
[2] Determination according to DIN 53735 at 150° C. under a load of 10 kg.
[3] Determination of the discharge in g/hour at 80° C. under a load of 21.6 kg. Apparatus as in the $i_{10}$ measurement.

The laminated glass samples prepared according to Examples 4(a) and (b) are completely clear and transparent.

We claim:

1. A process for preparing polyvinylbutyral of reduced tackiness and improved tensile strength by acetalization of polyvinyl alcohol with n-butryaldehyde in aqueous phase in the presence of an acid catalyst, which comprises:

acetalizing polyvinyl alcohol; the polyvinyl alcohol having less than 0.5% by weight of vinyl acetate units and being in the form of an aqueous solution cooled to a temperature below 20° C.; the acetalizing in said cooled aqueous polyvinyl alcohol solution starting at a temperature below 20° C., which temperature is raised to above 40° C. during the course of the reaction; the resulting polyvinylbutyral having a residual vinyl alcohol content of from 14 to 28% and a viscosity (measured according to DIN 53015 at 23° C. on a 5% by weight solution in ethanol) of between 10 and 200 mPa·s;

subjecting said resulting polyvinylbutyral, under acetalization conditions, to an aftertreatment of from 50° to 70° C. in the presence of up to 1% by weight (based on the weight of the resulting polyvinylbutyral) of an organic sulfonic acid or a salt thereof, the sulfonic acid having from 8 to 30 carbon atoms and an emulsifying action.

* * * * *